(12) United States Patent
Black et al.

(10) Patent No.: US 12,020,254 B1
(45) Date of Patent: Jun. 25, 2024

(54) SYSTEMS AND METHODS FOR PREVENTING FRAUDULENT CREDIT CARD AND DEBIT CARD TRANSACTIONS

(71) Applicant: UIPCO, LLC, San Antonio, TX (US)

(72) Inventors: Robert Lee Black, San Antonio, TX (US); Matthew Ryan Santacroce, San Antonio, TX (US); Andre Rene Buentello, San Antonio, TX (US); Jose L. Romero, Jr., San Antonio, TX (US); Timothy Blair Chalmers, San Antonio, TX (US); Samip Dilip Mehra, Peoria, AZ (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/152,823

(22) Filed: Jan. 11, 2023

Related U.S. Application Data (63) Continuation of application No. 16/997,987, filed on Aug. 20, 2020, now Pat. No. 11,568,410.

(60) Provisional application No. 62/891,044, filed on Aug. 23, 2019.

(51) Int. Cl.
*G06Q 20/40* (2012.01)
*G06K 7/00* (2006.01)
*G06Q 20/34* (2012.01)

(52) U.S. Cl.
CPC ..... *G06Q 20/40145* (2013.01); *G06K 7/0008* (2013.01); *G06Q 20/341* (2013.01); *G06Q 20/405* (2013.01)

(58) Field of Classification Search
CPC .......... G06Q 20/40145; G06Q 20/341; G06Q 20/405; G06K 7/0008
See application file for complete search history.

(56) References Cited

U.S. PATENT DOCUMENTS

| | | |
|---|---|---|
| 8,632,001 B1 | 1/2014 | Ramachandran |
| 11,257,072 B1 | 2/2022 | Aument |
| 2014/0172700 A1 | 6/2014 | Teuwen |
| 2016/0267486 A1 | 9/2016 | Mitra |
| 2016/0379220 A1 | 12/2016 | Tunnell |
| 2018/0005243 A1 | 1/2018 | Zovi |

OTHER PUBLICATIONS

Non Final Office Action dated Jul. 8, 2022 for U.S. Appl. No. 16/997,987.
Notice of Allowance dated Sep. 26, 2022 in U.S. Appl. No. 18/152,823.

*Primary Examiner* — Jamara A Franklin
(74) *Attorney, Agent, or Firm* — Plumsea Law Group, LLC (57) ABSTRACT

A system and method for preventing fraudulent credit card or debit card transactions by coupling a smart phone to the credit card or the debit card, and transmitting identification information from the smart phone to the card. The card is normally disabled such that no transaction may take place unless the card is enabled. The card receives the transmitted identification information and compares that information to corresponding information stored on the card. If the received information matches the stored information, the card is enabled thus allowing the transaction to take place.

20 Claims, 10 Drawing Sheets

SYSTEMS AND METHODS FOR PREVENTING FRAUDULENT CREDIT CARD AND DEBIT CARD TRANSACTIONS

CROSS-REFERENCE TO RELATED APPLICATIONS

This application is a Continuation of co-pending U.S. patent application Ser. No. 16/997,987, filed Aug. 20, 2020, and titled "Systems and Methods for Preventing Fraudulent Credit Card and Debit Card Transactions", which claims the benefit of Provisional Patent Application No. 62/891,044, filed Aug. 23, 2019, and titled "Systems and Methods for Preventing Fraudulent Credit Card and Debit Card Transactions", both of which are incorporated by reference herein in their entirety.

TECHNICAL FIELD

This disclosure relates generally to systems and methods for preventing fraudulent credit card transactions at retailers, banks or other institutions by implementing security measures.

BACKGROUND

Credit cards and debit cards are sometimes lost or stolen. Credit cards, for example, may subsequently be used by someone to make a fraudulent purchase at a retailer, since retailers do not generally ask for identification when processing a credit card purchase. Furthermore, even though debit cards require entry of a PIN in order to authenticate a transaction, in some cases an unauthorized person may somehow acquire the PIN, possibly by using a skimmer at an ATM, for example. For that reason, even debit cards may be vulnerable to fraudulent activities.

Nowadays, most credit cards and debit cards include a chip on the cards that must be read by a chip reader in order to approve a transaction. A user inserts the card in the chip reader. The chip reader then obtains information from the chip, and combines the chip information with information from the chip reader to create a token that is unique to the specific transaction. The token is then used to verify that it came from the chip on the user's card, and the chip reader approves the transaction. Nevertheless, even cards with chips may be vulnerable to fraudulent transactions.

For these reasons, there is a need for systems and methods that further minimize the likelihood of a fraudulent transaction being approved.

SUMMARY

In one aspect, embodiments include a method for validating a smart card transaction by associating a smart card with a smart phone, transmitting identification information from the smart phone to the smart card, and receiving the identification information at an antenna on the smart card. The received identification information is then provided to a comparator on the smart card. The comparator compares the received identification information to corresponding stored identification information stored on the smart card and enables the smart card if the received information matches the stored information by closing a normally-open switch interposed between the comparator and a digital section. The digital section is configured to be read by a chip reader in order to authorize the transaction.

In another aspect, embodiments include a smart card that has an antenna for receiving electromagnetic waves carrying identification information. A demodulator receives electromagnetic waves and provides a demodulated signal with the identification information to a comparator. The comparator compares the identification information provided to the comparator to stored identification information stored on the smart card. The smart card includes a digital section configured to be read by a chip reader and a normally-open switch interposed between the demodulator and the digital section. If the identification information provided to the comparator matches the stored identification information, the comparator provides a closing signal to the switch closing the switch for a predetermined time period, thus enabling the smart card for the predetermined time period so that it could be read by a chip reader.

In yet another aspect, embodiments include a system for preventing fraudulent card transactions using a smart phone and a smart card. The smart phone has an app for enabling a smart card by providing identification data to the smart card by broadcasting electromagnetic waves that carry the identification data to the smart card. The smart card has an antenna for receiving the electromagnetic waves from the smart phone. The antenna is connected to a matching network, which is electrically connected to a demodulator. A comparator receives demodulated signals from the demodulator and compares the identification data received from the smart phone to identification data stored on the smart card. The smart card also has a digital section configured to be read by a chip reader. It also has a switch interposed between the demodulator and the digital section. The switch is normally open such that the demodulated signals are prevented from reaching the digital section. The switch may be closed for a predetermined time period when the comparator determines that the identification data received from the smart phone matches the identification data stored on the smart card and sends a signal to the switch closing the switch.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

The embodiments disclosed herein provide systems and methods for further reducing the risk that a particular credit card or debit card transaction (such as a purchase at a retailer or a withdrawal at an ATM) be fraudulent. The embodiments require the use of a smart phone that can be associated with special circuits within the chips on credit cards or debit cards, as described below.

Credit or debit cards equipped with these special circuits will be referred to herein as "smart cards." The terms "authentication" and "validation" may be used interchangeably herein, since data that authenticates a user serves to validate a transaction. The acronym "NFC" as used herein refers to "Near-field Communication," which typically uses 13.56 MHz electromagnetic waves.

The descriptions below of embodiments of the smart card technology will initially describe smart cards that have a chip that can be read by a chip reader at a retailer or a bank, for example, but do not also have a magnetic strip that could be read by swiping the card through a slot. Later on, the descriptions of embodiments of the smart card technology will also include descriptions of embodiments of smart cards that have both a chip and a magnetic strip.

When a user wishes to make a transaction using a smart phone together with a smart card, the user may activate an app on the phone to start the process. For example, in some embodiments the user may activate the app simply by clicking on the app on the user's smart phone, or by bringing the smart card in close proximity to the smart phone. In any event, once the app is activated and the smart phone is in sufficiently close proximity to the smart card, the smart phone and the smart card can interact with each other so that the smart card could be enabled for completing financial transactions or left in its disabled state to prevent a financial transaction from being executed.

Briefly, in some embodiments the smart card may initially be disabled so that it could not be used for financial transactions (or for other types of activities) unless it becomes enabled by the user's smart phone. In some embodiments, the smart card is only enabled for a predetermined time period. That enablement time period may be chosen by the issuer of the smart card or by the user of the smart card. For example, if a typical user of the smart card completes his or her transactions in a couple of minutes or less, the enablement time period my be set to as short a time as one minute, or to three minutes, five minutes, ten minutes or more. When the time period has expired, the smart card may be returned to its disabled state.

Embodiments of the smart card include electrical circuits that can determine whether the user is an authorized user of the smart card, and then enable the smart card if the user is an authorized user. In many embodiments, the smart card acts as a passive Radio-Frequency Identification (RFID) tag, that is energized by electromagnetic waves broadcast by the smart phone and coupled to electrical circuits in the smart card. In other embodiments, the smart card may be powered by its own internal battery, such that it would not need to be energized by electromagnetic waves broadcast by the smart phone. In either case, the smart phone then determines whether the user is authorized to use the smart card by comparing data received from the smart phone to data stored on the smart card itself. Thus the smart phone serves to authenticate the smart card as being used by an authorized user.

Figure 1:
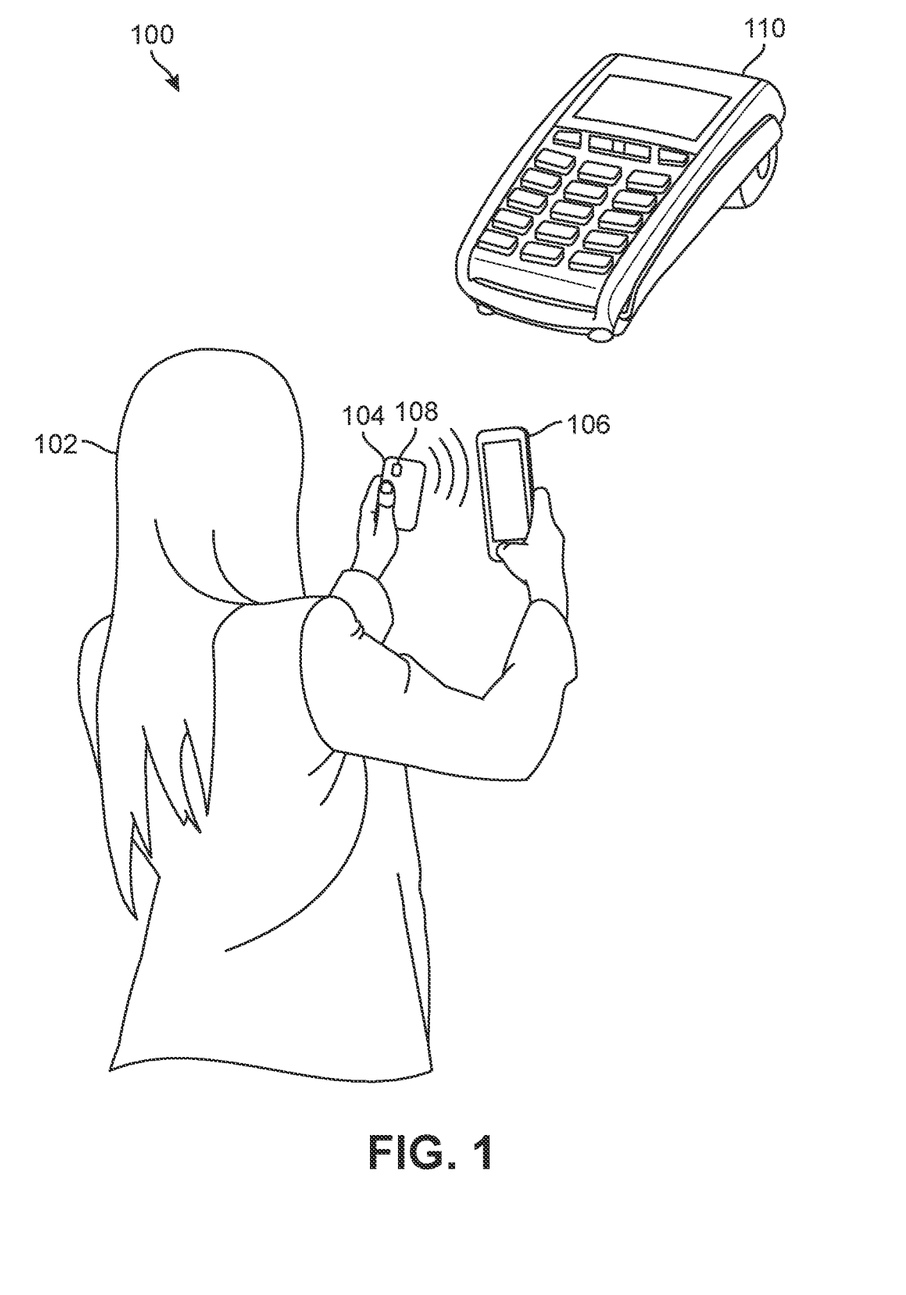
FIG. 1 is a schematic representation of a customer associating her credit card with her smart phone.

FIG. 1 is an exemplary illustration of a typical scenario 100 in which a user 102 is associating her smart card 104 with her smart phone 106 just prior to inserting smart card 104 into chip reader 110. Smart card 104 has a chip 108 that is connected to an antenna for receiving, for example, NFC electromagnetic waves broadcast by the smart phone, and for coupling the electrical circuit to the smart phone. The circuit also includes logic elements that can decode information received on the electromagnetic waves and determine whether the user is authorized to use the card. In this example, the user has activated an app on her smart phone to start the process by which the smart card can confirm that she is an authorized user.

Figure 2:
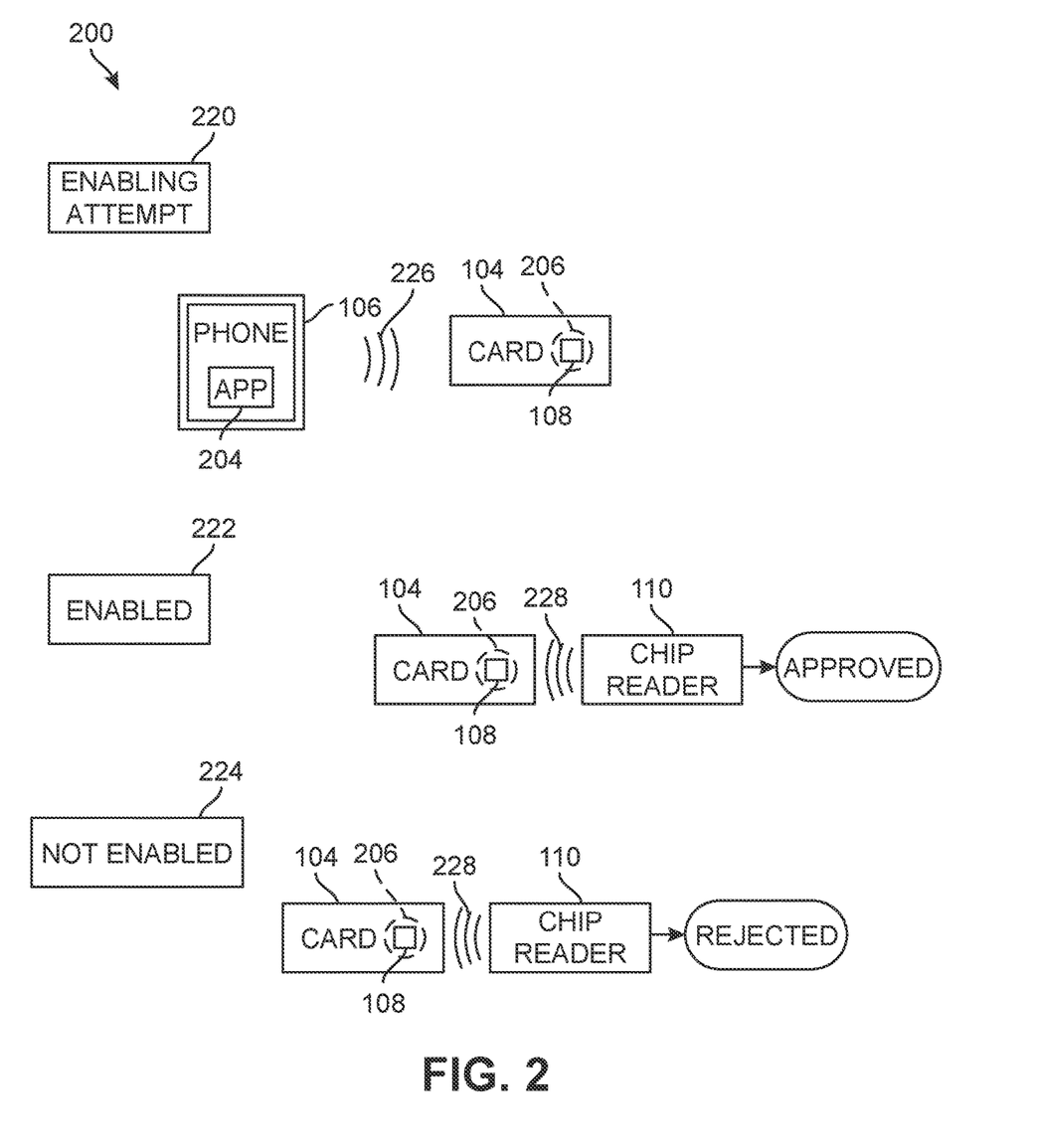
FIG. 2 is a schematic diagram outlining the approval process when a credit card or debit card is enabled and the rejection process when a credit card is not enabled, in an embodiment.

As shown in the schematic block diagram 200 of FIG. 2, user 102 has activated app 204 on her smart phone 106 to attempt to enable her smart card in step 220. Smart phone 106 then broadcasts NFC electromagnetic waves 226 towards smart card 104. Instead of using electromagnetic waves at the NFC frequency, the electromagnetic waves may be broadcast at another frequency, such as at a Bluetooth frequency of 2.4 to 2.5 GHz, or at an LF frequency in the 120 to 150 KHz range. The electromagnetic waves could also be broadcast at any other frequency that might currently or in the future be used by the smart phones, such as, for example, 850 MHz, 900 MHz, 1,800 MHz and 1,900 MHz frequencies, or any other frequencies that may be developed for possible use by smart phones in the future.

Figure 3:
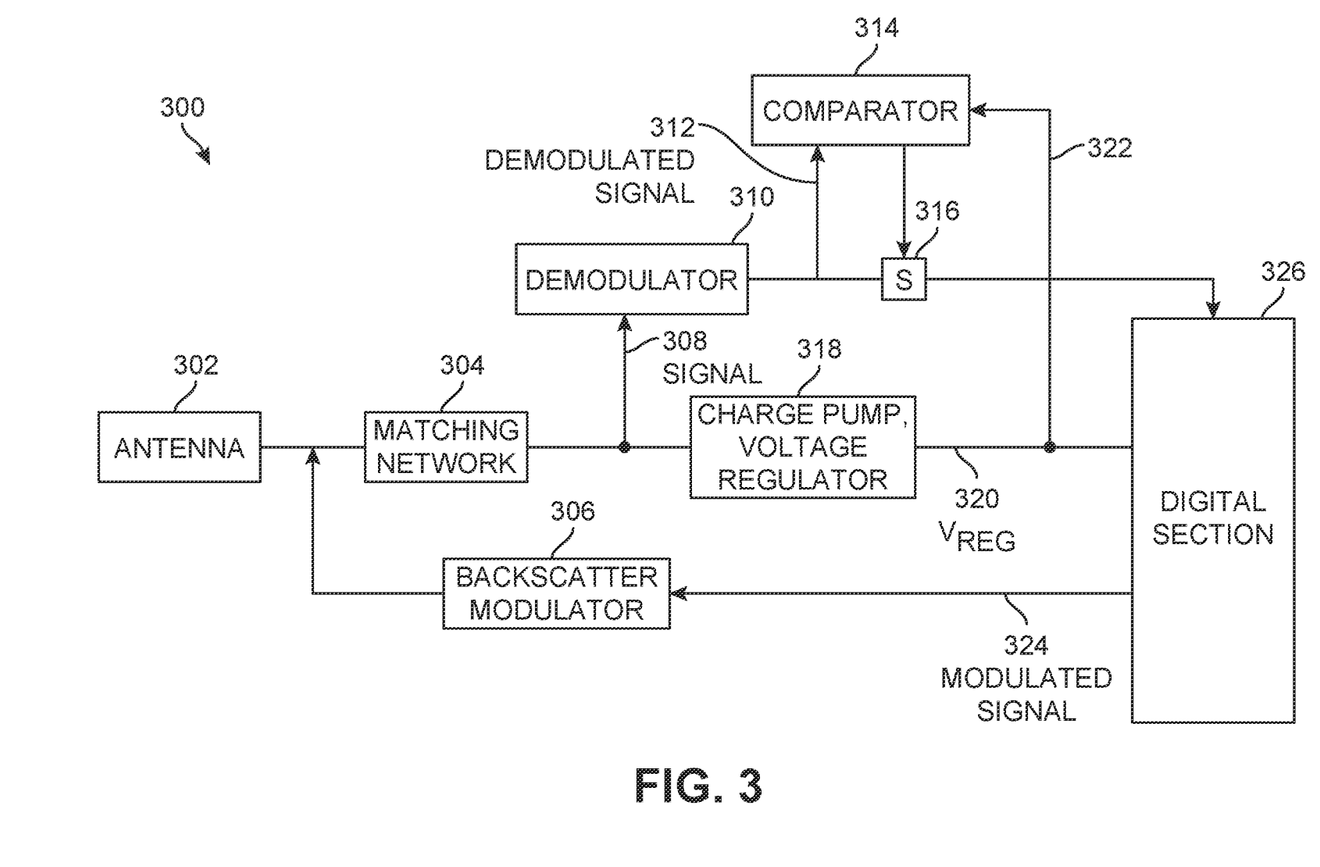
FIG. 3 is a diagram of an exemplary circuit for enabling or rejecting a credit card or debit card, in an embodiment.

In the example shown in FIGS. 2-3, smart card 104 includes an NFC antenna 206 for receiving NFC electromagnetic waves, which is connected to chip 108. In many embodiments, chip 108 is similar to the standard chips used in chip card, but with two additional elements, a comparator and a transistor switch, as described below with reference to FIG. 3. These additional elements may be incorporated in the chip itself, or may be located on the smart card outside the chip. If smart card 104 is in close proximity to smart phone 106 (as in the example shown in FIG. 1), smart card 104 receives NFC electromagnetic waves 226 via its NFC antenna 206, such that smart card 104 and smart phone 106 are coupled to each other. Moreover, if smart card 104 is operating as a passive RFID tag in this context, smart card 104 must be close enough to the smart phone such that the electromagnetic waves 226 that are received by antenna 206 have sufficient amplitude to power the electronic circuits on smart card 104, as described below with reference to FIG. 3. The electromagnetic waves 226 broadcast by smart phone 106 may carry data such as the smart phone's number and/or IP address and may also include additional data, such as a personal identification number or PIN, fingerprint data, voice data, password data and/or facial recognition data. If the data received by smart card 104 corresponds to authorization data stored in smart card 104, in step 222 the transaction is approved when the user inserts her smart card into chip reader 110. Chip reader 110 interrogates smart card 104 via electromagnetic waves 228. If the data received by smart card 104 does not correspond to authorization data stored in smart card 104, the transaction is rejected in step 224 when smart card 104 is inserted into chip reader 110, because chip 108 has not been enabled.

Although FIG. 3 shows a circuit based on a passive RFID design, in which the circuit is powered by the electromagnetic waves broadcast by a smart phone, in some embodiments the smart card may have its own battery, in which case the charge pump/voltage regulator unit shown in FIG. 3 would not be necessary.

FIG. 3 is an exemplary circuit 300 that may be used in to enable a smart card or to leave the smart card disabled, in an embodiment. The NFC electromagnetic waves are received by antenna 302, which may be a dipole antenna or a patch antenna, for example. That antenna may be printed as a metallic pattern on the smart card. The signal from the antenna is then provided to a matching network 304 that receives that signal and provides it to a charge pump and voltage regulator unit 318. The regulated voltage 320 produced by charge pump and voltage regulator unit 318 is then provided to digital section 326. Voltage 320 is also provided to comparator 314 over connection 322. Voltage 320 is also provided to the other active circuit elements, such as demodulator 310, transistor switch 316 and backscatter modulator 306, although for simplicity the voltage connection to these devices is not shown explicitly in FIG. 3. In many embodiments, digital section 326 includes circuitry and devices that are similar to or functionally the same as the circuitry and devices used by conventional chip cards.

The signal 308 from matching network 304 is also provided to demodulator 310. Once demodulator 310 has been activated by voltage received from charge pump and voltage regulator unit 318, it provides a demodulated signal 312 to comparator 314 and to transistor switch 316. Transistor switch 316 is normally open, such that demodulated signal 312 cannot reach digital section 326. Demodulated signal 312 includes authorization data stored in smart phone 106, such as the smart phone's phone number, another phone number or the smart phone's IP address, as well as a PIN, fingerprint data, voice data, password data and/or facial recognition data. Comparator 314 then compares the authorization data in demodulated signal 312 to its stored authorization data. If the received authorization data matches the stored authorization data, comparator 314 sends a signal to transistor switch 316 closing transistor switch 316, thus enabling smart card 104. After a predetermined time period, in some embodiments, comparator 314 sends another signal to transistor switch 316, returning it to its open state. In other embodiments, transistor switch 316 returns to its open state at the expiration of the predetermined time period automatically, without having to receive a trigger signal from comparator 314. Digital section 326 may also send a modulated signal 324 to backscatter modulator 306 for example, to acknowledge receipt of a communication, to provide information back to smart phone 106 or to submit a query or an instruction to smart phone 106.

Backscatter modulator 306 modulates the input impedance of antenna 302 and matching network 304. This modulated impedance in turn modulates the coupling of the smart phone to the smart card. Because this modulated coupling can be detected by the smart phone, it can be used to transmit instructions, queries or data from the smart card to the smart phone. For example, digital section 326 may need to communicate with app 204 or other apps on smart phone 106 to acknowledge receipt of signals or to indicate, for example, that the chip is no longer being enabled. Backscatter modulation may also be used in some embodiments in which information may be requested by the smart card as part of the validation process of the smart card. For example, the smart card may request that the user apply his or her fingertip to a sensor on the smart phone, look into the smart phone camera to generate real-time facial recognition data, speak a phrase to generate real time voice recognition data or to enter a password.

Figure 4:
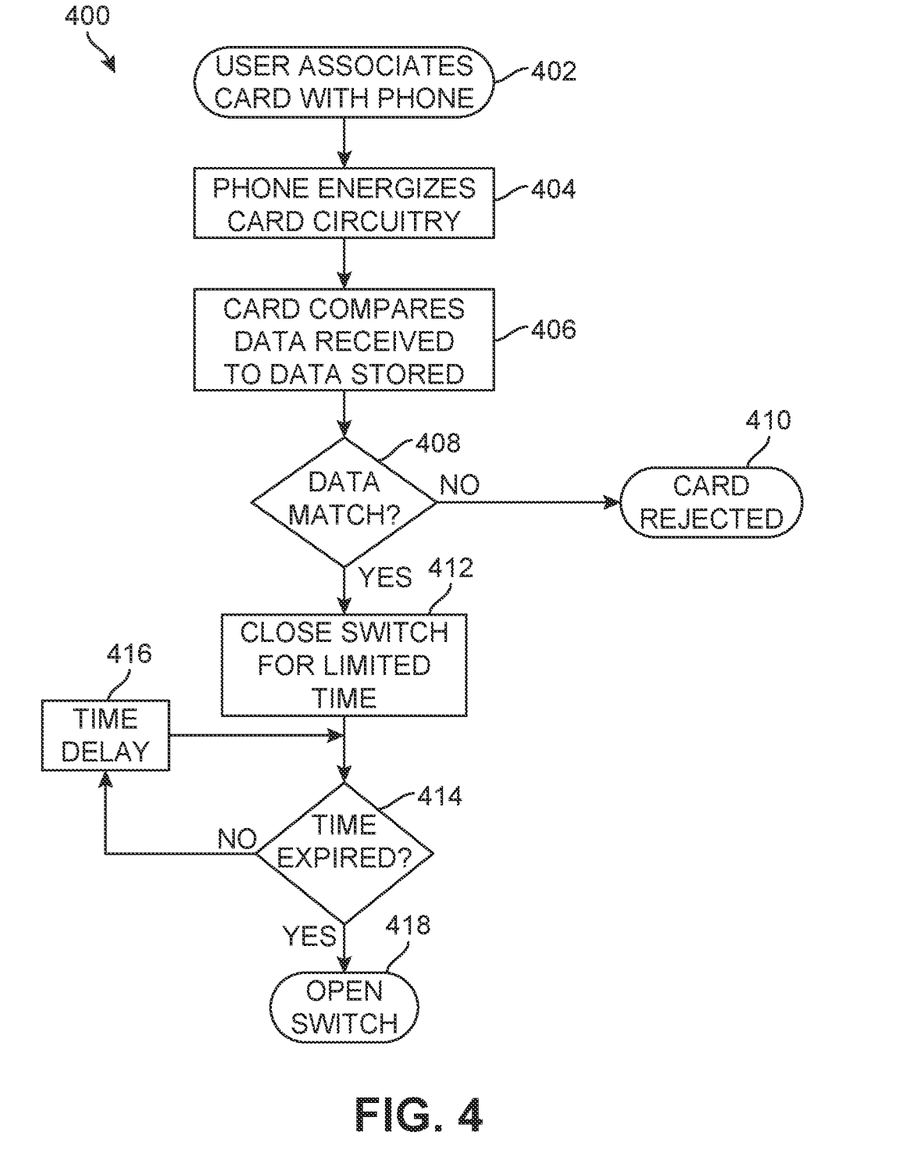
FIG. 4 is a flowchart of an exemplary process for enabling or rejecting a credit card or a debit card, in an embodiment.

FIG. 4 illustrates an exemplary process 400 for enabling a smart card or for leaving the smart card in its default non-enabled state. The process starts in step 402 when a user associates the user's smart card with the user's smart phone. In step 404, the phone receives electromagnetic waves such as NFC waves that energize active elements in circuit 300, such as demodulator 310, comparator 314, transistor switch 316, digital section 326 and backscatter modulator 306. In step 406, comparator 314 on smart card 104 compares the data received from smart phone 106 to the corresponding data stored in comparator 314. The data may be the smart phone's phone number, the smart phone's IP address, a password, a PIN or biometric data, for example. If the data match, in step 408 the process goes on to close transistor switch 316 in step 412 for a predetermined limited time (such as one minute, 3 minutes or 10 minutes, for example). If the data do not match, transistor switch 316 remains open, such that the card will be rejected by chip reader 110 in step 410. In step 414, the process checks whether the limited time has expired. If it has, transistor switch 316 is opened in step 418, thus disabling smart card 104. If time has not expired, the process goes to a brief delay (typically for a few seconds, or for a longer time, possibly for as long as one minute) in step 416 then returns to step 414 to again check whether time has expired.

The process shown in the exemplary flowchart for the embodiment of FIG. 4 applies without any additional steps to smart cards that do not have a magnetic strip. Chip cards that do have a magnetic strip may need additional steps, since merchants may often allow a customer to use the magnetic strip on a chip card when authorization via the chip reader fails. If the merchant allows a user to do so, the user could then simply swipe his or her card and thus avoid the smart card protections against unauthorized users.

Figure 5:
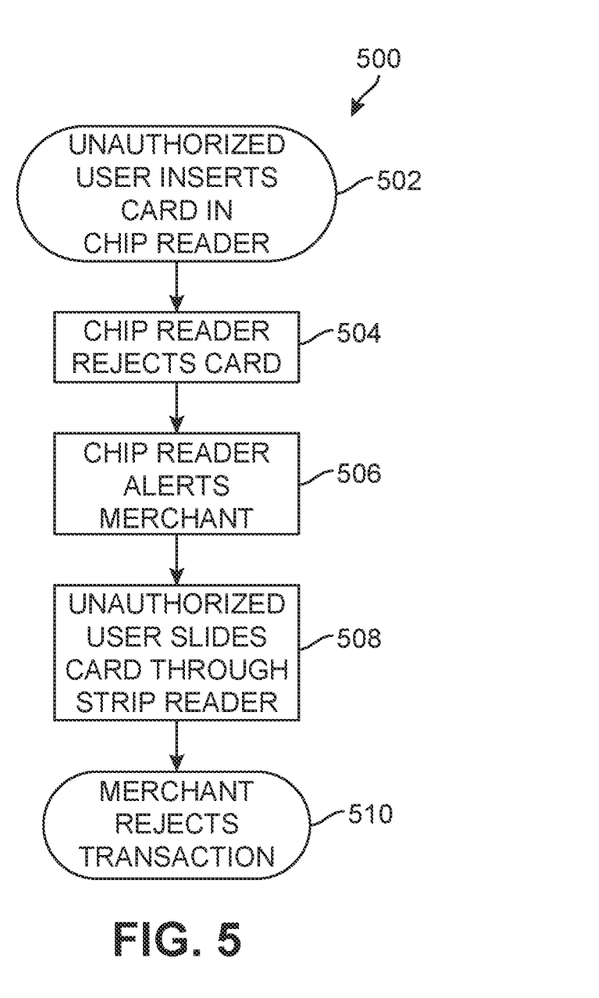
FIG. 5 is a flowchart of an exemplary process for rejecting an attempt by an unauthorized user to use a credit card or a debit card, in an embodiment.

Flowchart 500 illustrated in FIG. 5 is an example of a process that might be used to address the issue of smart cards with magnetic strips. For example, in step 502 an unauthorized holder of a smart card may insert a smart card into a chip reader. The chip reader then rejects the smart card in step 504 because it was not enabled, as described above with reference to FIG. 4. The chip reader may then alert the merchant or sales clerk in step 506 that the smart card was initially rejected because the holder may not have been an authorized user of the smart card. Then, if in step 508 the holder slides the smart card through a slot in the magnetic strip reader portion of the merchant's device, the merchant may reject the transaction in step 510.

Step 406 in flowchart 400 requires a comparison of data received from the smart phone to corresponding data stored on the smart card. In some cases, that data may include biometric data such as a fingerprint match, voice recognition or facial recognition. An exemplary process for determining whether the received data matches the stored data is illustrated in flowchart 600 shown in FIG. 6. The process starts in step 602, when the smart card is associated with the smart phone and the smart card circuit is energized. In step 604, comparator 314 compares, for example the smart phone's phone number or IP address, a PIN, a password or other identification data received from the smart phone to the corresponding identification data stored on the smart card. In step 606, if the received data does not match the stored data, the process proceeds to step 612. In step 612, switching transistor 316 remains open, such that the smart card remains in its non-enabled state and the transaction is rejected. If the identification data do match in step 606, comparator 314 compares the received biometric data to the stored biometric data in step 608.

Figure 6:
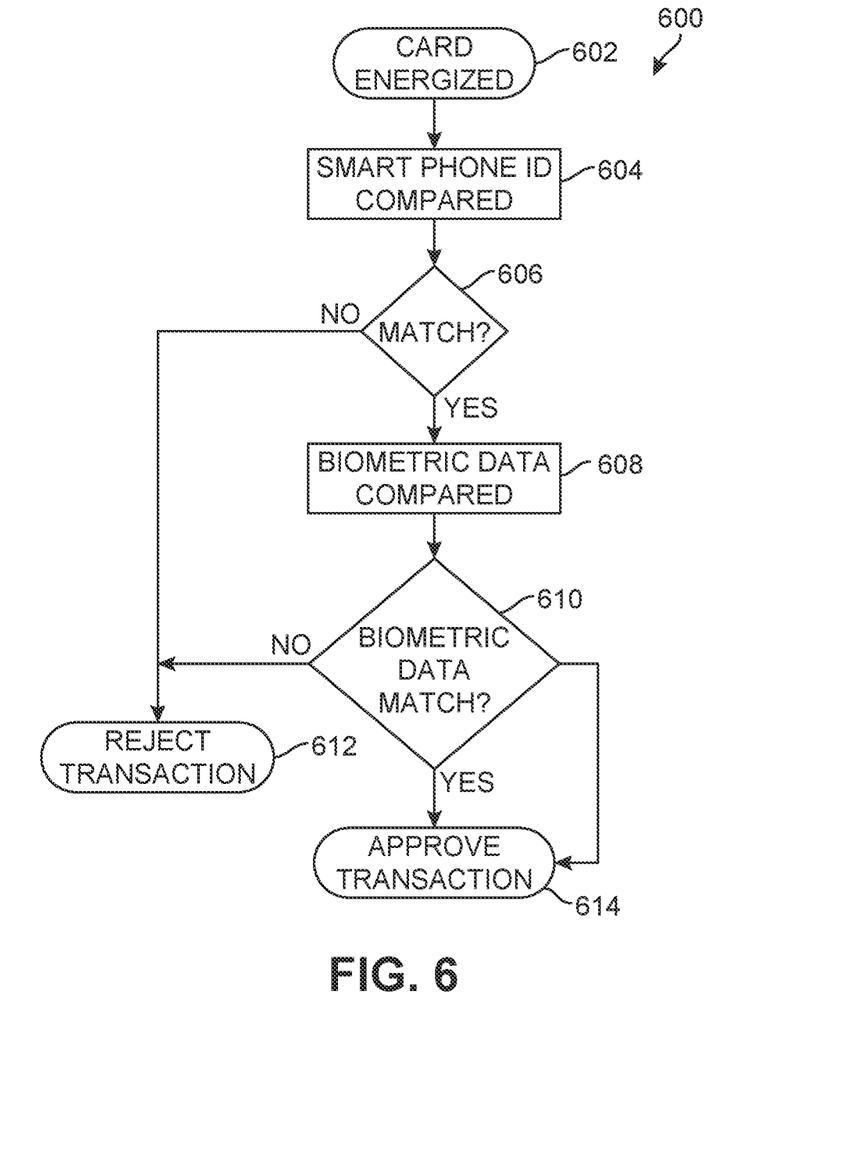
FIG. 6 is a flowchart of an exemplary process for authenticating or rejecting a credit card or debit card transaction, in an embodiment.

The received biometric data might have been stored in the smart phone. However, in some embodiments the smart phone is instructed (using backscatter modulator 306, for example) to ask the user to generate the biometric data in real time, by presenting his or her face to the smart phone's camera to generate facial recognition data, by uttering a pre-selected phrase to generate voice recognition data, or by applying a fingertip to a touch sensor to generate fingerprint data, for example. If the biometric data do not match, the process proceeds to step 612, in which the smart card remains in its non-enabled state and the transaction is rejected. If the biometric data do match, switching transistor 316 closes, such that the smart card is enabled and the transaction is approved in step 614.

The flowchart shown in FIG. 6 has two sets of validation/authentication steps. These are (1) steps 604 and 606 which compare smart phone ID data such as the smart phone number, the smart phone's IP address, a PIN or a password, and (2) steps 608 and 610 in which biometric data is obtained from the smart phone (either from previously stored data or from data generated in real time) and compared to the corresponding biometric data stored on the smart card. Although at least one of these validation/authentication steps is necessary, they are not both necessary. Thus the smart phone ID data comparison validation steps 604-606 are optional if the biometric comparison steps 608-610 are included in the validation process, and the biometric comparison validation steps 608-610 are optional if the data comparison steps 604-606 are included in the validation process. In many embodiments, both validation sets of steps are used. The steps may also be combined into just one set of steps, such that there is only one decision step (to approve or reject the transaction) after both types of validation steps are included in a single set of validation steps. In that case, steps 604 to 610 would be collapsed into just one set of a comparison step and a validation step.

As noted above, the biometric data obtained from the smart phone may be biometric data stored in the smart phone, or it may be biometric data that is generated at the time of the transaction, by having the user apply his or her fingertip to a touch sensor, present his or her face to the smart phone camera to generate facial recognition data or utter a pre-selected phrase to generate voice recognition data.

Requiring users to apply their fingertips to a sensor on their smart phones, to generate an image of their face or to utter a pre-selected phrase in real time may be relatively inconvenient with respect to transactions of only a few dollars. For that reason, the credit card issuer may prefer to reserve certain types of identifications for relatively large transactions, in which the amount at issue is larger than a predetermined set amount. In that case, the process illustrated in flowchart 700 in FIG. 7 may be used.

Figure 7:
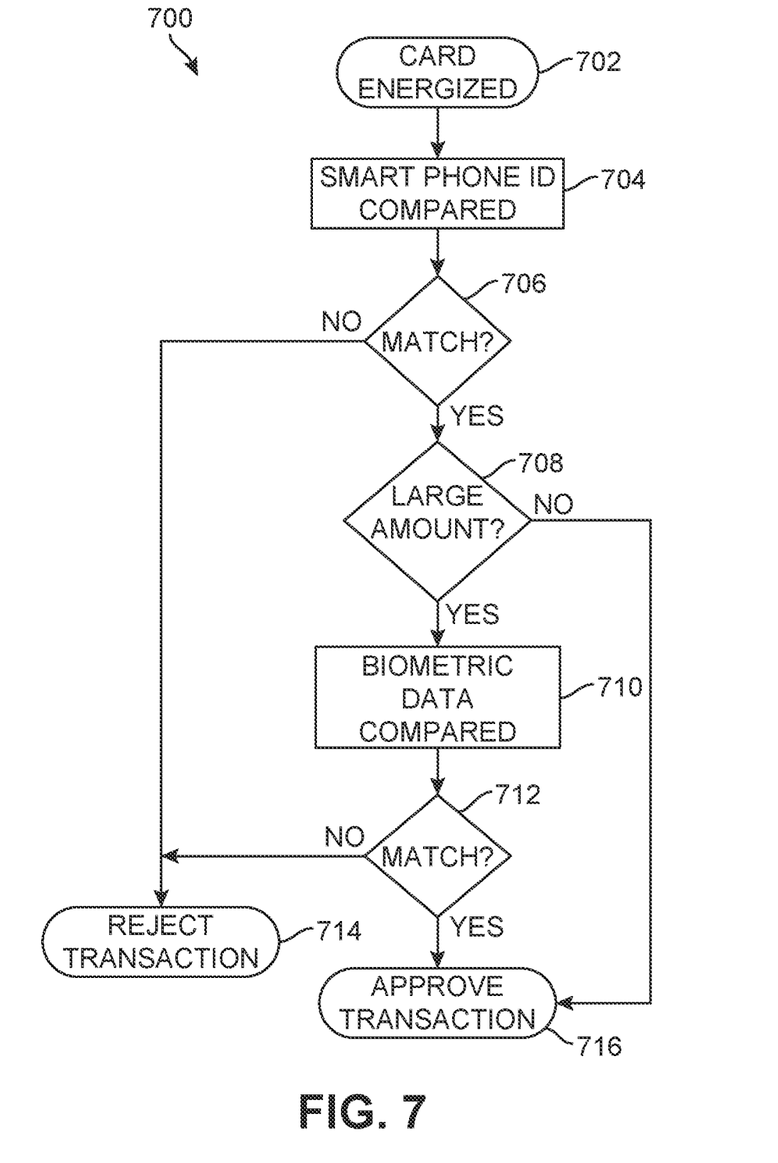
FIG. 7 is a flowchart of another exemplary process for authenticating or rejecting a credit card or debit card transaction, in an embodiment.

The process starts at step 702 when the circuit on the smart card is energized when the user associates his smart phone with the smart card and the smart phone sends its identification data (such as its phone number, its IP address, a PIN or a password, for example) to the smart card. In step 704, the comparator compares the received identification data to the stored identification data. If the data do not match, step 706 sends the process to step 7124 where the transaction is rejected. If the data do match, then the process continues in step 708, which determines whether the amount at issue is larger than the predetermined set amount. If it is not larger, then the transaction is approved in step 716. If it is larger than the set amount, the process requires the user to submit specific biometric data in real time, for example via the smart phone screen, the smart phone's microphone or a touch sensor. After the user submits, for example, biometric data such as a fingerprint, a voice imprint or an image of his or her face via the smart phone, the process compares the received biometric data to the stored biometric data in step 710. If the data match, step 712 continues the process in step 716, where the transaction is approved. If the data do not match, the transaction is rejected in step 714.

Figure 8:
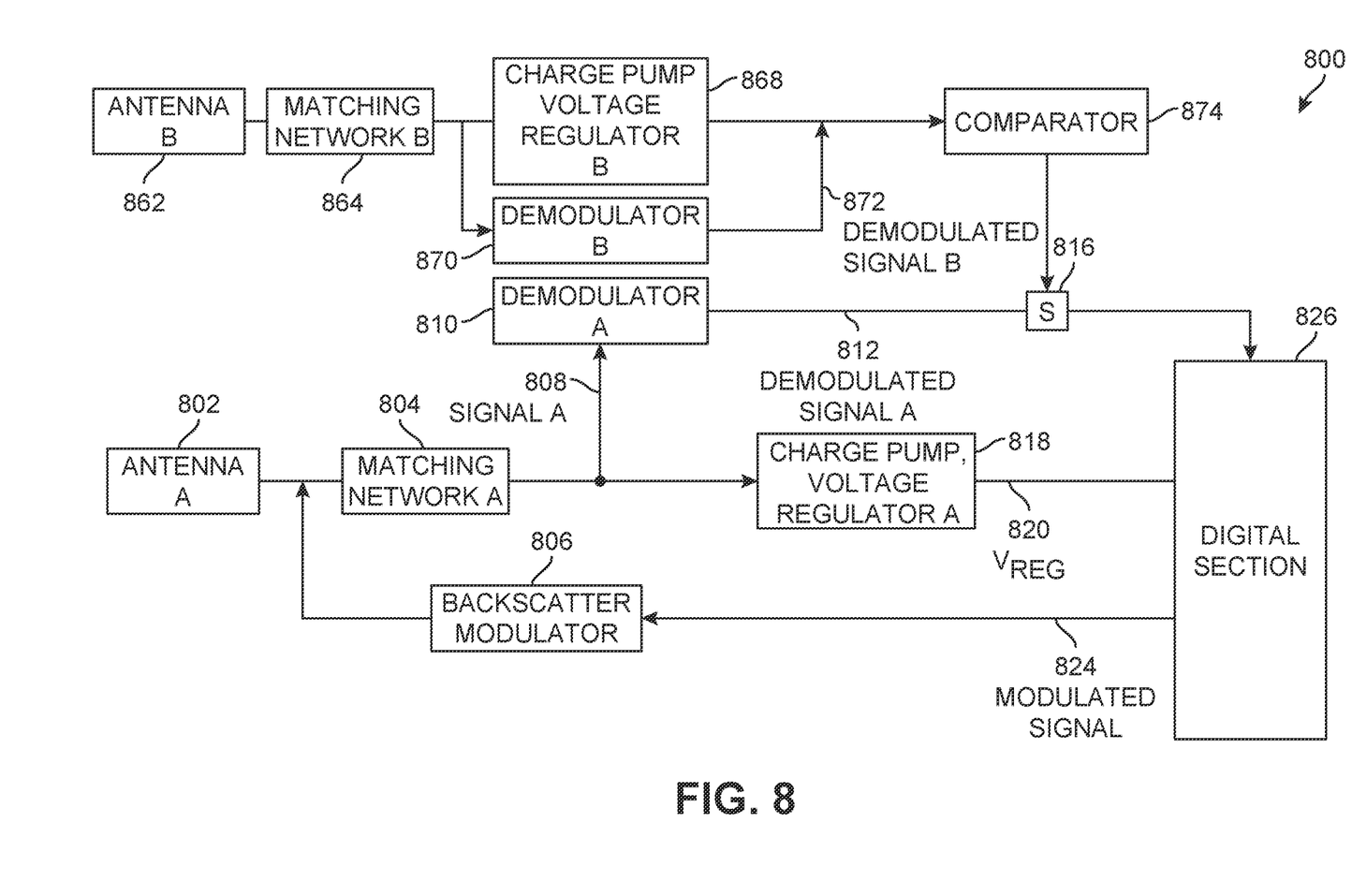
FIG. 8 is a diagram of an exemplary two-antenna circuit for enabling or not enabling a credit card or a debit card, in an embodiment.
Figure 9:
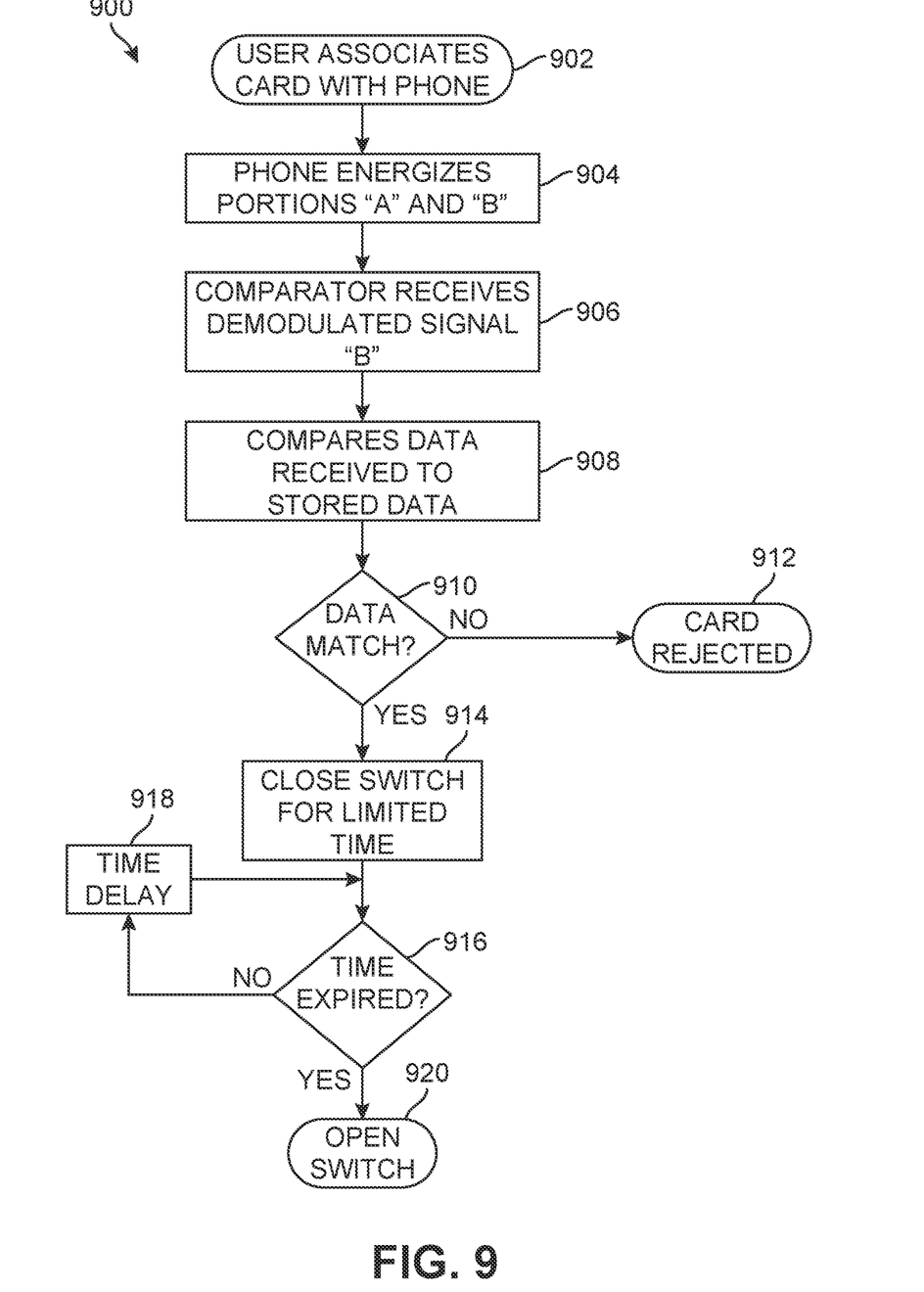
FIG. 9 is a flowchart of an exemplary process for authenticating or rejecting a credit card or debit card transaction using the circuit of FIG. 8, in an embodiment.

FIGS. 8 and 9 relate to another embodiment of the smart card. This embodiment uses two antennas that may be tuned to different frequencies in some embodiments or to the same frequency in other embodiments. As shown in FIG. 8, circuit 800 has an "A" portion and a "B" portion. Antenna A may be tuned to a first frequency and antenna B may be tuned either to a second, different frequency or to the first frequency. For example, antenna A 802 may be tuned to the NFC 13.56 MHz frequency and antenna B may be tuned to a low frequency in the 120 to 150 KHz range, or to any other frequencies that may be available in smart phones, such as the 850 MHz, 900 MHz, 1,800 MHz and 1,900 MHz frequencies, or the Bluetooth frequency of 2.4-2.5 GHZ in some embodiments. Also, other frequencies may be available as the wireless technology continues to be developed. In other embodiments, the "B" antenna may be tuned to the NFC 13.56 MHz frequency, in which case comparator 874 might use the steps shown in FIG. 10, which is described below. The "A" portion and the "B" portion of the circuit shown in FIG. 8 operate independently, except that comparator 874, which is in the "B" portion, controls the open/closed state of switching transistor 816, which is in the "A" portion of smart card circuit 800.

The "A" portion of circuit 800 includes matching network A 804 which receives the signal at the first frequency from antenna A 802 and feeds that signal to charge pump and voltage regulator unit A 818 and to demodulator 810. Charge pump and voltage regulator unit A 818 provides the voltage 820 necessary to operate digital section 826, transistor switch 816 (voltage connection not shown for simplicity in FIG. 8), demodulator 810 (voltage connection not shown for simplicity in FIG. 8) and backscatter modulator 806 (voltage connection not shown for simplicity in FIG. 8). Signal A 808 is fed to demodulator A 810, which demodulates the signal and feeds the demodulated signal A 812 to digital section 826 if switching transistor 816 is closed. In many embodiments, digital section 826 includes circuitry and devices that are similar to or functionally the same as the circuitry and devices used by conventional chip cards. Digital section 826 may also provide a modulated signal 824 to backscatter modulator 806 in order to provide information, queries or instructions back to the smart phone. Transistor switch 816 is normally open, such that the smart card is not enabled unless transistor switch 816 is closed by a signal from comparator 874. A predetermined period after switch 816 is closed, transistor switch 816 is returned to its open state by another signal from comparator 874, or it may return to its open state automatically.

The "B" portion of circuit 800 includes matching network B 864 which receives the signal from antenna B 862 and provides it to charge pump and voltage regulator unit B 868, and also provides it to demodulator B 870. This signal may be at a frequency that is different from the first frequency or it may be at the same frequency as the first frequency. In the latter case, in some embodiments, comparator 874 may execute some additional steps as described below with respect to FIG. 10. Charge pump and voltage regulator unit B 868 provides regulated voltage to demodulator B 870 (connection not shown) and comparator 874. Demodulator B 870 provides demodulated signal B 872 to comparator 874. If comparator 874 determines that the data received via demodulated signal B 872 matches the data stored in the smart card, it closes switching transistor 816 thus enabling the smart card until a predetermined period has expired, as noted above. If the data do not match, switching transistor 816 remains open, thus keeping the smart card disabled.

A process that may be used by a smart card that has a two-antenna circuit may follow flow chart 900, which is shown in FIG. 9. The process starts in step 902, when the user associated her smart card with her smart phone. In step 904, the smart phone then energizes both the "A" and "B" portions of circuit 800 shown in FIG. 8. In step 906, comparator 874 receives demodulated signal B 872 and compares the received phone identification or biometric data provided by demodulated signal B 872 to the stored data in step 908. In step 910, if the received data does not match the stored data, transistor switch 816 is not closed by comparator 874, the smart card is not enabled and the card is rejected in step 912. In step 910, if the data does match, transistor switch 816 is closed for a predetermined limited time period in step 914, thus enabling the smart card so that its chip can be read by the chip reader. In step 916, the process checks to determine if the limited time period has expired. If the time period has not expired, the process proceeds to a time delay in step 918 and then returns to check if time has expired in step 916. If time period has expired, transistor switch 816 is opened in step 920, thus disabling the smart card and ending the process until the user again associates the smart card with the smart phone.

Figure 10:
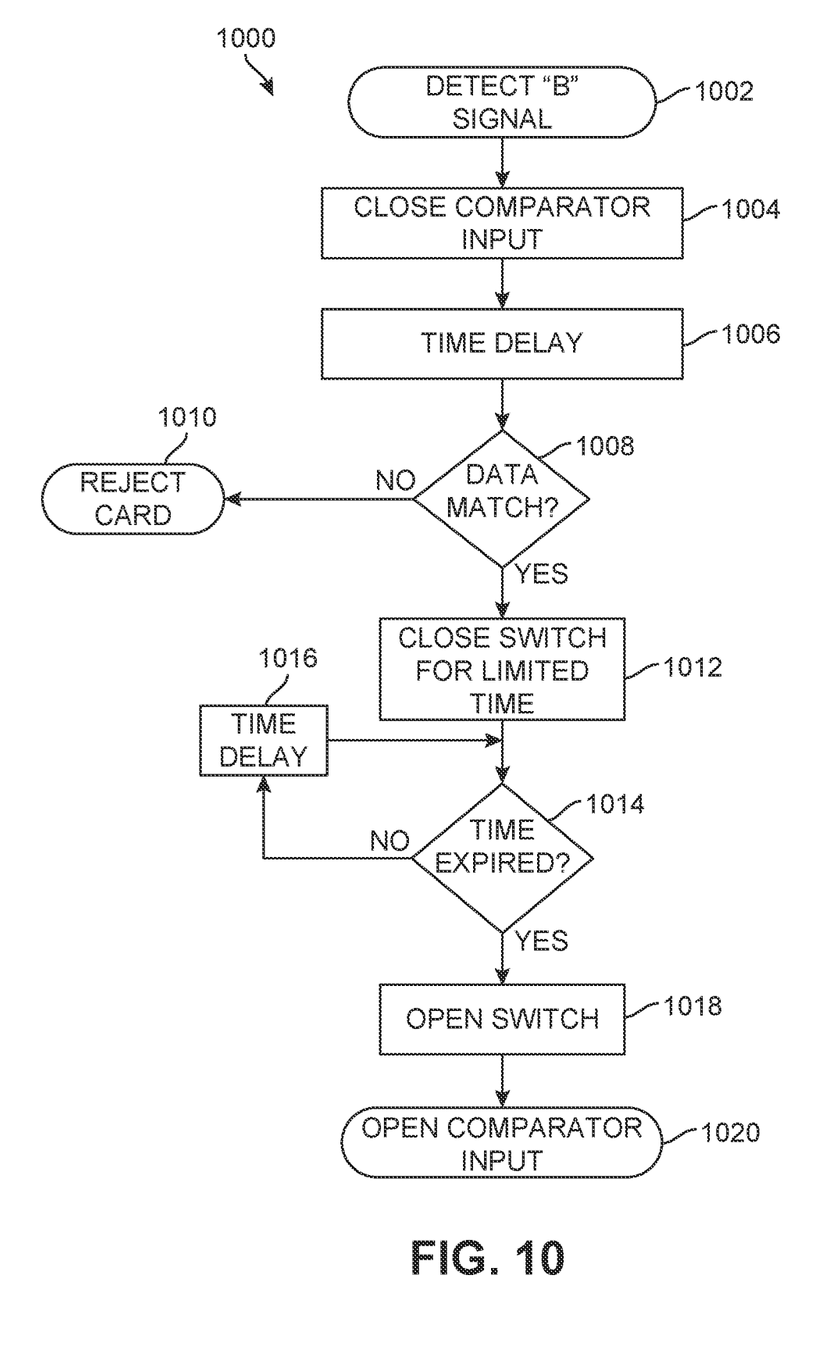
FIG. 10 is a flowchart of another exemplary process that may be used with the circuit of FIG. 8.

Flow chart 1000 shown in FIG. 10 discloses steps that may be executed by the comparator so as to separate the operations of the "B" portion of the circuit from the operations of the "A" portion of the circuit in embodiments which use the same frequency for the "A" and "B" portions of the circuit shown in FIG. 8. In essence, the comparator closes the input to the "B" portion for a predetermined time once it has transmitted a signal to open the transistor switch. Flowchart 1000 starts at step 1002 when the "B" portion of the circuit detects a signal. In step 1004 the comparator closes down its input so that it no longer responds to any signals received from antenna "B" 862. After a brief time delay (typically one second, for example) in step 1006, comparator 874 determines whether the received data matches the stored data in step 1008. If the data do not match, the card will be rejected in step 1010 because transistor switch 816 will not have been closed. If the data do match, transistor switch 816 is closed for a limited predetermined time in step 1012. Step 1014 checks if the limited time has expired, and the process cycles back through step 1014 after a time delay in step 1016. When time has expired, transistor switch 816 is opened in step 1018, and the comparator input is opened in step 1020.

This two-antenna embodiment may be more robust than a single-antenna embodiment, because the comparator portion of the circuit (portion B in FIG. 8) is essentially isolated from the conventional chip reader portion of the circuit (portion A in FIG. 8), and in some embodiments because it is operating at a different frequency or because the operations in the "B" portion of the circuit are separated in time from the operations of the "A" portion of the circuit. For example, backscatter modulation may be used by the A portion of the circuit to communicate with the smart phone without affecting the B portion of the circuit in any way because of the isolation of the two portions of the circuit.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A smart card comprising:
    a first antenna for receiving electromagnetic waves at a first frequency carrying identification information;
    a second antenna for receiving electromagnetic waves at a second frequency, the second antenna in communication with a switching transistor and a digital section configured to be read by a chip reader; and
    a demodulator in communication with the first antenna for demodulating the electromagnetic waves at the first frequency and providing a demodulated signal comprising the identification information to a comparator in communication with the switching transistor, wherein the comparator compares the identification information provided to the comparator to stored identification information stored on the smart card;
    wherein if the identification information provided to the comparator matches the stored identification information, the comparator provides a closing signal to the switching transistor closing the transistor switch and enabling the smart card so that the smart card is readable read by a chip reader.

2. The smart card of claim 1, wherein the second frequency is different than the first frequency.

3. The smart card of claim 1, wherein the smart card further comprises a circuit comprising:
    a comparator portion comprising the first antenna; and
    a chip reader portion comprising the second portion.

4. The smart card of claim 3, wherein the comparator portion is isolated from and operates independently of the chip reader portion.

5. The smart card of claim 3, wherein:
    the comparator portion further comprises the comparator and the demodulator; and
    the chip reader portion further comprises the switching transistor.

6. The smart card of claim 3, wherein the chip reader portion further comprises a backscatter modulator in communication with the second antenna and the digital section to receive a modulated signal from the digital section that is used by the backscatter modulator to modulate an input impedance of the second antenna.

7. The smart card of claim 6, wherein the modulated input impedance facilitates transmission of information from the second antenna.

8. The smart card of claim 7, wherein the information comprises instructions, queries, or data.

9. The smart card of claim 6, wherein:
operations in the comparator portion are separated in time from operations in the chip reader portion; and
the modulated input impedance does not affect the comparator portion.

10. The smart card of claim 1, wherein the second frequency comprises 13.56 MHz.

11. The smart card of claim 1, wherein the first frequency is from 120 KHz to 150 KHz.

12. The smart card of claim 1, wherein the switching transistor comprises a normally open transistor switch.

13. A system for preventing fraudulent transactions comprising:
a smart phone comprising an app for enabling a smart card by providing identification data to the smart card by broadcasting electromagnetic waves that carry the identification information to the smart card;
the smart card comprising:
a first antenna for receiving electromagnetic waves from the smart phone at a first frequency and carrying the identification information;
a second antenna for receiving electromagnetic waves from the smart phone at a second frequency, the second antenna in communication with a switching transistor and a digital section configured to be read by a chip reader; and
a demodulator in communication with the first antenna for demodulating the electromagnetic waves at the first frequency and providing a demodulated signal comprising the identification information to a comparator in communication with the switching transistor, wherein the comparator compares the identification information provided to the comparator to stored identification information stored on the smart card; wherein if the identification information provided to the comparator matches the stored identification information, the comparator provides a closing signal to the switching transistor closing the transistor switch and enabling the smart card so that the smart card is readable read by a chip reader.

14. The system of claim 13, wherein the smart card further comprises a circuit comprising:
a comparator portion comprising the first antenna; and
a chip reader portion comprising the second portion; and
the comparator portion is isolated from and operates independently of the chip reader portion.

15. The system of claim 14, wherein the chip reader portion further comprises a backscatter modulator in communication with the second antenna and the digital section to receive a modulated signal from the digital section that is used by the backscatter modulator to modulate an input impedance of the second antenna that modulates a coupling of the smartphone to the smart card.

16. The system of claim 15, wherein the modulated input impedance and coupling facilitate transmission of information from the second antenna.

17. The system of claim 16, wherein the information comprises instructions, queries, or data.

18. The system of claim 14, wherein:
operations in the comparator portion are separated in time from operations in the chip reader portion; and
the modulated input impedance does not affect the comparator portion.

19. A method for validating a smart card transaction, the method comprising:
associating a smart card with a smart phone;
using the smart phone to energize a comparator portion and a chip reader portion of a circuit on the smart card by:
transmitting electromagnetic waves carrying the identification data at a first frequency from the smart phone to a first antenna in the comparator portion; and transmitting electromagnetic waves at a second frequency from the smart phone to a second antenna in the chip reader portion;
providing that received identification information to a comparator in the comparator portion;
using the comparator to comparing the received identification information to corresponding stored identification information; and
closing a normally-open switch in the chip reader portion between the second antenna and a digital section to enable the smart card if the received information matches the stored information;
wherein the digital section is configured to be read by a chip reader in order to authorize the transaction.

20. The method of claim 19, wherein the comparator portion is isolated from and operates independently of the chip reader portion.

* * * * *